(12) United States Patent
Yamaguchi et al.

(10) Patent No.: US 7,570,346 B2
(45) Date of Patent: Aug. 4, 2009

(54) DETECTION DEVICE

(75) Inventors: Atsushi Yamaguchi, Mizuho (JP); Shinji Kobayashi, Gifu (JP); Masato Yamada, Inuyama (JP); Shuichi Ichiura, Hashima (JP)

(73) Assignee: Sanyo Electric Co., Ltd., Osaka (JP)

( * ) Notice: Subject to any disclaimer, the term of this patent is extended or adjusted under 35 U.S.C. 154(b) by 120 days.

(21) Appl. No.: 11/377,449

(22) Filed: Mar. 17, 2006

(65) Prior Publication Data
US 2006/0215148 A1    Sep. 28, 2006

(30) Foreign Application Priority Data
Mar. 17, 2005   (JP) ............... 2005-076357

(51) Int. Cl.
*G01C 3/08* (2006.01)
(52) U.S. Cl. ..................... 356/4.01; 356/614
(58) Field of Classification Search .............. 356/4.01
See application file for complete search history.

(56) References Cited

U.S. PATENT DOCUMENTS

| | | | | |
|---|---|---|---|---|
| 4,632,543 | A * | 12/1986 | Endo | 356/5.08 |
| 5,153,722 | A * | 10/1992 | Goedeke et al. | 348/159 |
| 6,025,797 | A * | 2/2000 | Kawai et al. | 342/70 |
| 6,671,037 | B2 * | 12/2003 | Isogai et al. | 356/4.01 |
| 7,042,387 | B2 * | 5/2006 | Ridenour et al. | 342/26 B |
| 2004/0175183 | A1 * | 9/2004 | Willhoeft et al. | 398/140 |

FOREIGN PATENT DOCUMENTS

| | | |
|---|---|---|
| JP | 05-203740 | 8/1993 |
| JP | 08-152476 | 6/1996 |
| JP | 10-147197 | 6/1998 |
| JP | 11-160436 | 6/1999 |
| JP | 11-325885 | 11/1999 |
| JP | 2001-050723 | 2/2001 |

OTHER PUBLICATIONS

Japanese Notice of Reasons for Refusal, with English Translation, issued in Japanese Patent Application No. JP 2005-076357 dated on May 13, 2008.
Japanese Decision of Final Rejection, with English Translation, issued Japanese Patent Application No. JP 2005-076357 dated on Aug. 19, 2008.

* cited by examiner

*Primary Examiner*—Thomas H Tarcza
*Assistant Examiner*—Timothy A Brainard
(74) *Attorney, Agent, or Firm*—McDermott Will & Emery LLP

(57) ABSTRACT

A scan trajectory of a laser beam is controlled based on external signals each related to a driving direction and a driving speed, a result obtained by detection of an obstacle, and signals related to distances to the obstacle. For example, at the time of a right turn, a scan trajectory for increasing scan frequency on a portion shifted in a right-turn direction from a center axis in a driving direction is set. At the time of high-speed driving, a scan trajectory for increasing scan frequency on a center portion in the driving direction is set. When the obstacle is detected at a position corresponding to a distance shorter than a threshold distance, a scan trajectory for increasing scan frequency in the vicinity of the obstacle is set. Detection and monitoring are performed at the time of: changing of the driving direction, the high-speed driving, and the detection of the obstacle.

6 Claims, 16 Drawing Sheets

POSITION-VOLTAGE CHARACTERISTICS

STRUCTURE OF PSD

SCAN OPERATION

EXAMPLE OF SCAN TRAJECTORY

SPOT TRAJECTORY ON PSD

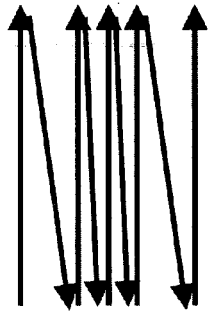

FIG.10A

PATTERN EXAMPLE 1

WEIGHTING OF CENTER PORTION IS HIGH (SLIGHT OVERLAP IN CENTER PORTION)

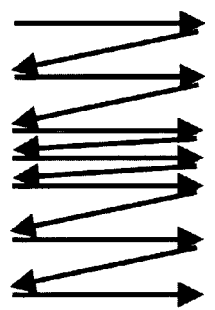

FIG.10B

PATTERN EXAMPLE 2

WEIGHTING OF CENTER PORTION IN LATERAL WIDTH DIRECTION IS HIGH

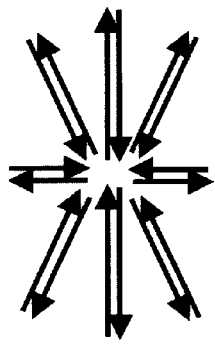

FIG.10C

PATTERN EXAMPLE 3

WEIGHTING OF CENTER PORTION IN LONGITUDINAL WIDTH DIRECTION IS HIGH

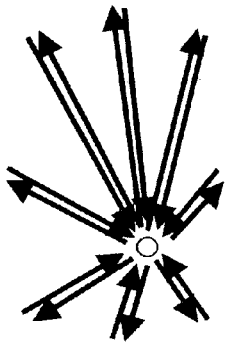

FIG.10D

PATTERN EXAMPLE 4

WEIGHTING OF RIGHT SIDE PORTION IN LATERAL WIDTH DIRECTION IS HIGH

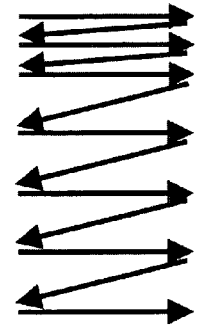

FIG.10E

PATTERN EXAMPLE 5

WEIGHTING OF RIGHT SIDE PORTION IN LATERAL WIDTH DIRECTION IS HIGH

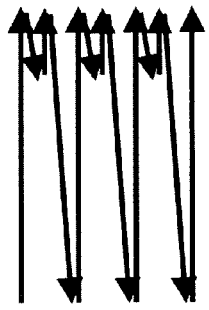

FIG.10F

PATTERN EXAMPLE 6

WEIGHTING IS PARTIALLY HIGH (SLIGHT OVERLAP IN TARGET POSITION)

FIG.11A

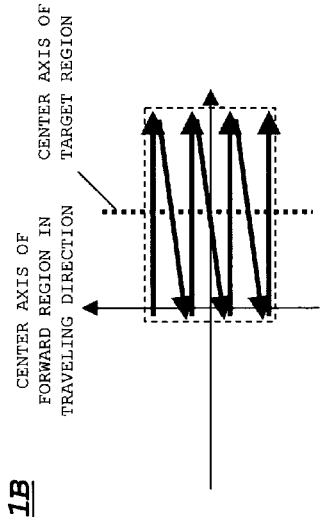

AT STRAIGHT-AHEAD DRIVING

AREA SYMMETRICAL ABOUT CENTER AXIS OF FORWARD REGION IN TRAVELING DIRECTION IS SCANNED

FIG.11B

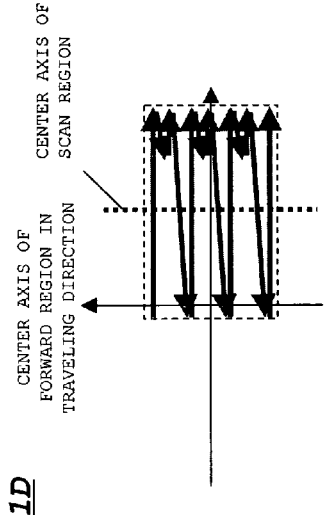

AT STEERING 1 (RIGHT TURN STEERING)

AREA ASYMMETRICAL ABOUT CENTER AXIS OF FORWARD REGION IN TRAVELING DIRECTION IS SCANNED
(ANGLE BETWEEN DIRECTION TO CENTER AXIS OF SCAN REGION AND DIRECTION TO CENTER AXIS IN TRAVELING DIRECTION SIMPLY INCREASES ACCORDING TO STEERING ANGLE)

FIG.11C

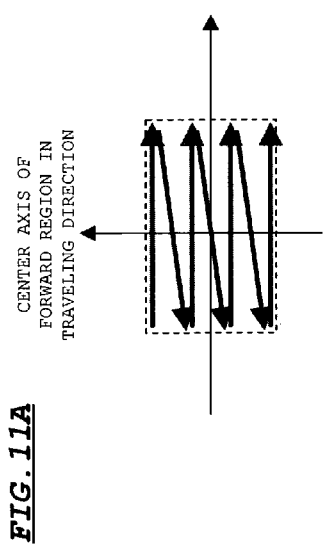

AT STEERING 2 (RIGHT TURN STEERING)

AREA SYMMETRICAL ABOUT CENTER AXIS OF FORWARD REGION IN TRAVELING DIRECTION IS SCANNED USING PATTERN IN WHICH RIGHT SIDE IN LATERAL WIDTH DIRECTION IS WEIGHTED

FIG.11D

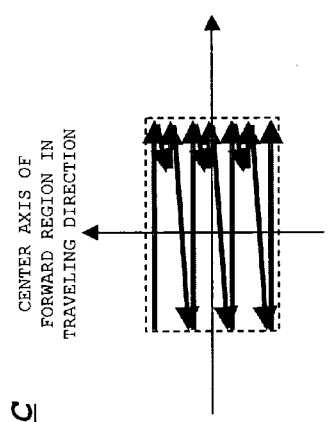

AT STEERING 3 (RIGHT TURN STEERING)

AREA ASYMMETRICAL ABOUT CENTER AXIS OF FORWARD REGION IN TRAVELING DIRECTION IS SCANNED USING PATTERN IN WHICH RIGHT SIDE IN LATERAL WIDTH DIRECTION IS WEIGHTED

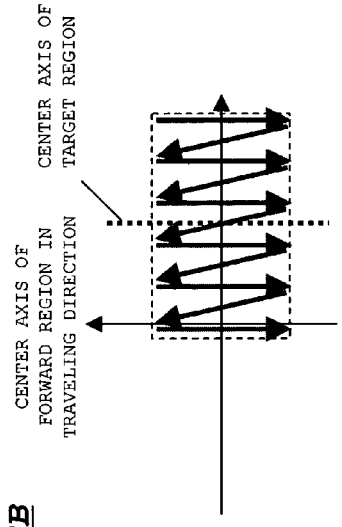

FIG.12B

AT STEERING 1 (RIGHT TURN STEERING)

AREA ASYMMETRICAL ABOUT CENTER AXIS OF FORWARD REGION IN TRAVELING DIRECTION IS SCANNED (ANGLE BETWEEN DIRECTION TO CENTER AXIS OF SCAN REGION AND DIRECTION TO CENTER AXIS IN TRAVELING DIRECTION SIMPLY INCREASES ACCORDING TO STEERING ANGLE)

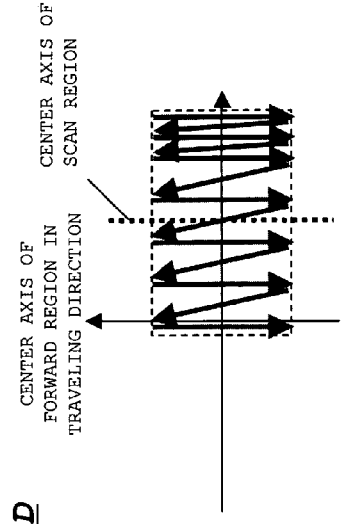

FIG.12D

AT STEERING 3 (RIGHT TURN STEERING)

AREA ASYMMETRICAL ABOUT CENTER AXIS OF FORWARD REGION IN TRAVELING DIRECTION IS SCANNED USING PATTERN IN WHICH RIGHT SIDE IN LATERAL WIDTH DIRECTION IS WEIGHTED

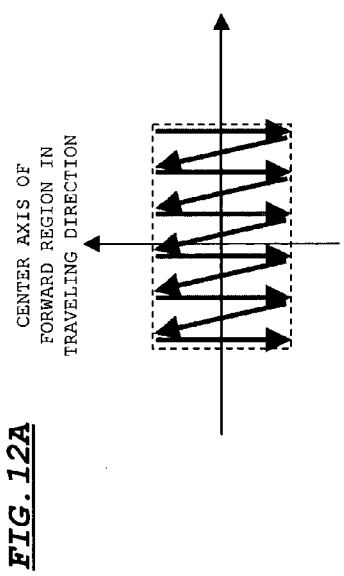

FIG.12A

AT STRAIGHT-AHEAD DRIVING

AREA SYMMETRICAL ABOUT CENTER AXIS OF FORWARD REGION IN TRAVELING DIRECTION IS SCANNED

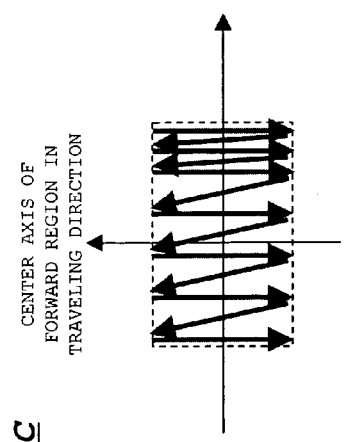

FIG.12C

AT STEERING 2 (RIGHT TURN STEERING)

AREA SYMMETRICAL ABOUT CENTER AXIS OF FORWARD REGION IN TRAVELING DIRECTION IS SCANNED USING PATTERN IN WHICH RIGHT SIDE IN LATERAL WIDTH DIRECTION IS WEIGHTED

AT NORMAL DRIVING

CENTER POSITION OF FORWARD REGION IN TRAVELING DIRECTION IS SET AS SCAN ORIGIN

AT DETECTION OF OBSTACLE

SCAN ORIGIN IS SHIFTED TO OBSTACLE DETECTION POSITION

AT DETECTION OF OBSTACLE

SCAN ORIGIN IS SHIFTED TO OBSTACLE DETECTION POSITION

DETECTION DEVICE

BACKGROUND OF THE INVENTION

1. Field of the Invention

The present invention relates to a detection device for detecting an obstacle within a target region by emitting a laser beam to the target region, which is suitable, for example, to be mounted on a moving object such as a vehicle or an airplane.

2. Description of the Related Art

In recent years, in order to improve driving safety, a detection device for detecting an obstacle ahead in a driving direction of a vehicle or the like is mounted, for example, on a family vehicle. The detection device scans a target region with a laser beam to detect the presence or absence of the obstacle within the target region based on the presence or absence of a reflection beam of the laser beam. During normal driving, a scan pattern is set so as to scan with the laser beam the entire target region set ahead in the driving direction of the vehicle. A pulse beam is outputted to a predetermined position on the scan pattern, and the presence or absence of the obstacle at the scan position is detected based on whether or not a reflection beam of the pulse beam is detected by a photo detector. At this time, a distance to the obstacle is measured based on a period between the timing of outputting of the pulse beam and the timing of receiving of the reflection beam thereof.

When the driving direction turns to, for example, the right or the left, it is particularly necessary for the detection device to detect as early as possible an obstacle located in the direction to which the driving direction is turning, in order to achieve adequate control in subsequent driving. During high-speed driving, it is necessary to detect an obstacle located at a distance early enough so that the detection information can be reflected on driving control. When an obstacle is detected ahead in the driving direction of the vehicle, it is particularly necessary to monitor movement of the obstacle and a state thereof in great detail.

JP11-325885A describes a technique for detecting a deviation between a driving direction and a laser beam irradiation direction using an acceleration sensor to align the laser beam irradiation direction with the driving direction.

However, JP 11-325885 A does not describe how to control a laser beam scan state to be adapted to a high-speed driving mode, an obstacle detection mode, and a driving direction changing mode. JP 11-325885 A includes no more description than that the laser beam irradiation direction is merely adjusted so as to suppress the deviation between the laser beam irradiation direction and the driving direction when the driving direction changes.

SUMMARY OF THE INVENTION

An object of the present invention is to provide a detection device capable of detecting movement of an obstacle and a state thereof with high precision when a driving direction changes, at the time of high-speed driving, and when the obstacle is detected, by achieving adequate scan control.

A first aspect of the present invention is characterized by a detection device for detecting an obstacle within a target region by emitting a laser beam to the target region, including: scan control means for controlling a scan trajectory of the laser beam based on a signal related to a moving state of a moving object on which the detection device is mounted.

In the first aspect of the present invention, the scan control means may set the scan trajectory of the laser beam based on at least one of a signal related to a traveling direction of the moving object and a signal related to a traveling speed thereof.

To be more specific, the scan control means may set, as the scan trajectory of the laser beam, a scan trajectory for increasing scan frequency on a portion shifted in a direction to which the traveling direction is changed from a center axis in the traveling direction, based on the signal related to the traveling direction of the moving object.

Also, the scan control means may shift the target region in the direction to which the traveling direction is changed from the center axis in the traveling direction, based on the signal related to the traveling direction of the moving object.

Further, the scan control means may set, as a scan pattern of the laser beam within the target region, a scan pattern for increasing scan frequency on a portion shifted in the direction to which the traveling direction is changed from a center portion of the target region, based on the signal related to the traveling direction of the moving object.

Still further, in the first aspect of the present invention, the scan control means may set, as the scan trajectory of the laser beam, a scan trajectory for increasing scan frequency on a center portion of a forward region in the traveling direction with an increase of the traveling speed, based on the signal related to the traveling speed of the moving object.

Yet further, the scan control means may reduce the target region toward the center portion in the traveling direction with an increase of the traveling speed, based on the signal related to the traveling speed of the moving object.

Furthermore, the scan control means may set, as a scan pattern of the laser beam within the target region, a scan pattern for increasing scan frequency on the center portion of the target region with the increase of the traveling speed, based on the signal related to the traveling speed of the moving object.

In the detection device according to the first aspect of the present invention, the scan trajectory is corrected when the driving direction changes and at the time of high-speed driving. Therefore, the obstacle located in the direction to which the driving direction is to be changed and the obstacle located in the long distance in the driving direction can be detected with high precision.

That is, in the detection device according to the first aspect of the present invention, the scan frequency on the portion shifted in the direction to which the driving direction is changed from the center axis of a forward region in the driving direction is increased when the driving direction changes. Therefore, it is possible to detect as early as possible the obstacle located in the direction to which the driving direction is to be changed. In addition, the scan frequency on the center portion of a forward region in the driving direction is increased at the time of high-speed driving, so it is possible to instantaneously detect the obstacle located in the long distance in the driving direction.

A second aspect of the present invention is characterized by a detection device for detecting an obstacle within a target region by emitting a laser beam to the target region, which is characterized by including: scan control means for controlling a scan trajectory of the laser beam based on a result obtained by the detection of the obstacle.

In the second aspect of the present invention, the scan control means may set, as the scan trajectory of the laser beam, a scan trajectory for increasing scan frequency on a vicinity of the obstacle based on the result obtained by the detection of the obstacle.

To be more specific, the scan control means may set, as an origin of the scan trajectory, a detection position of the obstacle based on the result obtained by the detection of the obstacle and may set, as a scan pattern of the laser beam within the target region, a scan pattern in which the laser beam is repeatedly returned to the set origin.

Also, the scan control means may set, as the scan trajectory of the laser beam, the scan trajectory for increasing the scan frequency in the vicinity of the obstacle when a distance to the obstacle is shorter than a threshold distance.

In the detection device according to the second aspect of the present invention, the scan trajectory can be corrected at the time of detection of the obstacle. Therefore, the movement of the obstacle and the state thereof can be detected with high precision.

That is, in the detection device according to the second aspect of the present invention, the scan frequency in the vicinity of the obstacle is increased, so the movement of the obstacle and the state thereof can be detected in great detail. Also, in the second aspect, when the scan trajectory of the laser beam is set so as to increase the scan frequency in the vicinity of the obstacle in the case where the distance to the obstacle is shorter then the threshold distance, it is possible to prevent unnecessary monitoring of an obstacle located in the far-off distance. Therefore, adequate scan control can be achieved.

BRIEF DESCRIPTION OF THE DRAWINGS

The above-mentioned and other objects of the present invention and the novel features thereof will be completely more clear when the following descriptions of embodiments are read with reference to the accompanying drawings.

FIGS. 10A to 10F show examples of a scan pattern according to the embodiment of the present invention;

FIGS. 11A to 11D show modified examples of the scan pattern when a traveling direction changes according to the embodiment of the present invention;

FIGS. 12A to 12D show modified examples of the scan pattern when the traveling direction changes according to the embodiment of the present invention;

DETAILED DESCRIPTION OF THE PREFERRED EMBODIMENT

Embodiments of the present invention will be described hereinafter with reference to the drawings. It should be noted that this embodiment is made by applying the present invention to a beam irradiation device loaded into a vehicle. In this embodiment, the presence or absence of an obstacle in a scanning region and distance to the obstacle are detected by radiating laser beams from a front portion of a vehicle and scanning the laser beams in the scanning region.

Figure 1:
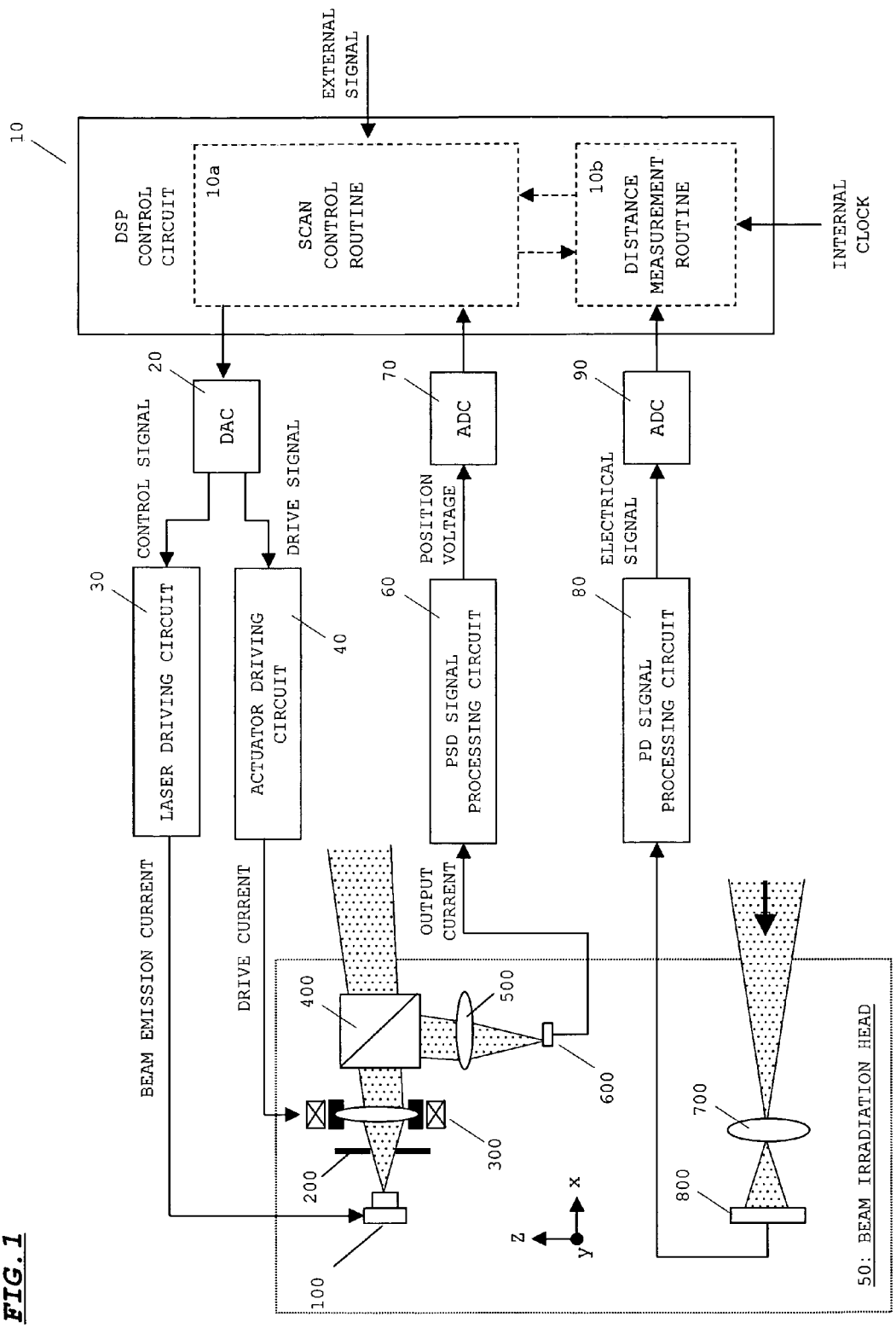
FIG. 1 shows a configuration of a beam irradiation device according to an embodiment of the present invention.

FIG. 1 shows the configuration of a beam irradiation device according to an embodiment of the present invention.

As shown in FIG. 1, a beam irradiation device is provided with a digital signal processor (DSP) control circuit 10, a digital analog converter (DAC) 20, a laser driving circuit 30, an actuator driving circuit 40, a beam irradiation head 50, a position sensitive detector (PSD) signal processing circuit 60, an analog digital converter (ADC) 70, a photo detector (PD) signal processing circuit 80 and an analog digital converter (ADC) 90.

The DSP control circuit 10 outputs a digital signal for performing drive control of the laser driving circuit 30 and the actuator driving circuit 40 to the DAC 20. Also, The DSP control circuit 10 detects the position of the obstacle in the scanning region and measures a distance to the obstacle based on the digital signal input from ADC 90. A scan control routine 10a and a distance measurement routine 10b are provided in the DSP control circuit 10.

Signals relating to the steering direction and speed of the vehicle are inputted to the scan control routine 10a as external signals. Also, signals relating to the position of the obstacle and the distance to the obstacle detected by the distance measurement routine 10b are inputted to the scan control routine 10a. Based on these signals, the scan control routine 10a changes the scan pattern and the scanning region. The scan control processing executed by the scan control routine 10a will be described later in detail.

High-frequency internal clock signals are inputted to the distance measurement routine 10b. The distance measurement routine 10b counts the number of clocks for the term between the timing of irradiation of pulse beam irradiated at each scan position and the timing of reception of the reflected pulse beam. Based on the number of clocks (clock number N), the distance measurement routine 10b detects the presence or absence of the obstacle at the scan position and the distance to the obstacle (distance L). For example, using a period of the internal clocks (T), the distance measurement routine 10b obtains the distance to the obstacle by calculating L=C×T× N/2 (C is the velocity of light). When the reflected pulse beam is not received in predetermined term, the distance measurement routine 10b judges that the obstacle is not exist at the scan position.

The DAC 20 converts the digital signal inputted from the DSP control circuit 10 into analog signals (control signals) and outputs the converted analog signals to the laser driving circuit 30 and the actuator driving circuit 40, respectively. The laser driving circuit 30 drives a semiconductor laser 100 in the beam irradiation head 50 in accordance with the control signal inputted from the DAC 20. The actuator driving circuit 40 drives a lens actuator 300 in the beam irradiation head 50 in accordance with the control signal inputted from the DAC 20.

The beam irradiation head 50 irradiates laser beams with a target region set in a space in front of the beam irradiation device while performing a scan. As shown in FIG. 1, the beam irradiation head 50 is provided with the semiconductor laser 100, an aperture 200, the lens actuator 300, a beam splitter 400, a converging lens 500, a PSD 600, a beam receiving lens 700 and a photo detector 800.

Laser beams emitted from the semiconductor laser 100 are shaped into a desired shape by the aperture 200 and then allowed to impinge on an irradiation lens supported by the lens actuator 300. The irradiation lens is supported by the lens actuator 300 so as to be displaceable in the direction of a y-z plane of FIG. 1. Therefore, the laser beams that have passed through the irradiation lens change in outgoing angle in the direction of the y-z plane as the lens actuator 300 is driven. Thus, a laser beam scan on the target region is performed.

A part of the laser beams that have passed through the irradiation lens is reflected by the beam splitter 400 and separated from radiated laser beams (laser beams radiated onto the target region). The separated laser beams (separated beams) are converged onto the PSD 600 through the converging lens 500. The PSD 600 has a beam receiving face parallel to an x-y plane of FIG. 1 and outputs a current corresponding to a convergence position of the separated beams on the beam receiving face. The convergence position of the separated beams on the beam receiving face and the irradiation position of the radiated laser beams on the target region correspond to each other on one-to-one basis. Therefore, the current outputted from the PSD 600 corresponds to the irradiation position of the radiated laser beams on the target region. The construction and current outputting operation of the PSD 600 will be described later in detail with reference to FIGS. 4, 5A, and 5B.

An output current from the PSD 600 is inputted to the PSD signal processing circuit 60. Based on the inputted current, the PSD signal processing circuit 60 outputs a voltage signal indicating a convergence position of the separated beams to the ADC 70. The ADC 70 converts the inputted voltage signal into a digital signal and outputs the converted signal to the DSP control circuit 10. The converted signal is inputted to the scan control routine 10a provided in the DSP control circuit 10. Based on the inputted voltage signal, the scan control routine 10a detects a convergence position of the separated beams on the beam receiving face.

Disposed in the DSP control circuit 10 are a table (scan table) for scanning the irradiation position of laser beams within the target region and a table (trajectory table) indicating a trajectory of the convergence position of separated beams on the beam receiving face when the laser beams are scanned according to the scan table.

In performing a laser beam scan operation, the scan control routine 10a outputs a signal for controlling the actuator driving circuit 40 to the DAC 20 while referring to the scan table. At the same time, the DSP control circuit 10 detects a convergence position of separated beams on the beam receiving face based on a signal inputted from the ADC 70, compares the detected position with a desired convergence position prescribed in the trajectory table, and outputs a signal for controlling the actuator driving circuit 40 to the DAC 20 such that the detected position is drawn to the desired convergence position. Due to this servo operation, the radiated laser beams perform a scan within the target region in such a manner as to follow the trajectory prescribed in the scan table. The servo operation will be described later in detail with reference to FIG. 7.

Furthermore, in performing the laser beam scan operation, the scan control routine 10a outputs a signal for setting an outgoing power of the semiconductor laser 100 to a low level Pwa to the laser driving circuit 30 via the DAC 20. At the same time, the DSP control circuit 10 monitors a convergence position of separated beams on the beam receiving face, and outputs a signal for setting the outgoing power of the semiconductor laser 100 to a high level Pwb in a pulse-like manner for a certain period to the laser driving circuit 30 via the DAC 20 at a timing when the convergence position reaches a position preset as a position (luminescent point) for detecting an obstacle, a distance, or the like. The power Pwa is set at least to such a value that a current allowing detection of a position of separated beams on the beam receiving face is outputted from the PSD 600. The power Pwb is set to a value sufficient for desired detection of an obstacle, distance, or the like. Thus, the radiated laser beams become luminescent with high power at the timing of arrival at the luminescence point while performing a scan within the target region with low power.

When an obstacle exists at each scan position in the target region, the laser beam emitted with high power is reflected by the obstacle and the reflected beam is received by the photo detector 800 through the receiving lens 700. The photo detector 800 outputs the electrical signal according to the amount of light income to the PD signal processing circuit 80. The PD signal processing circuit 80 amplifies and cancels noise from the electrical signal inputted from the photo detector 800 and outputs the produced electrical signal to the ADC 90. The ADC 90 converts the electrical signal inputted from the PD signal processing circuit 80 into digital signals and outputs the converted digital signals to the distance measurement routine 10b. The distance measurement routine 10b detects a timing for receiving the reflected beams based on the digital signal inputted from the ADC 90. The distance measurement routine 10b further detects the distance to the obstacle at the scan position based on a time difference between the timing for receiving the reflected beam and a timing for emitting the high-power laser beam inputted from the scan control routine 10a and outputs the detected distance to the scan control routine 10a.

Figure 2:
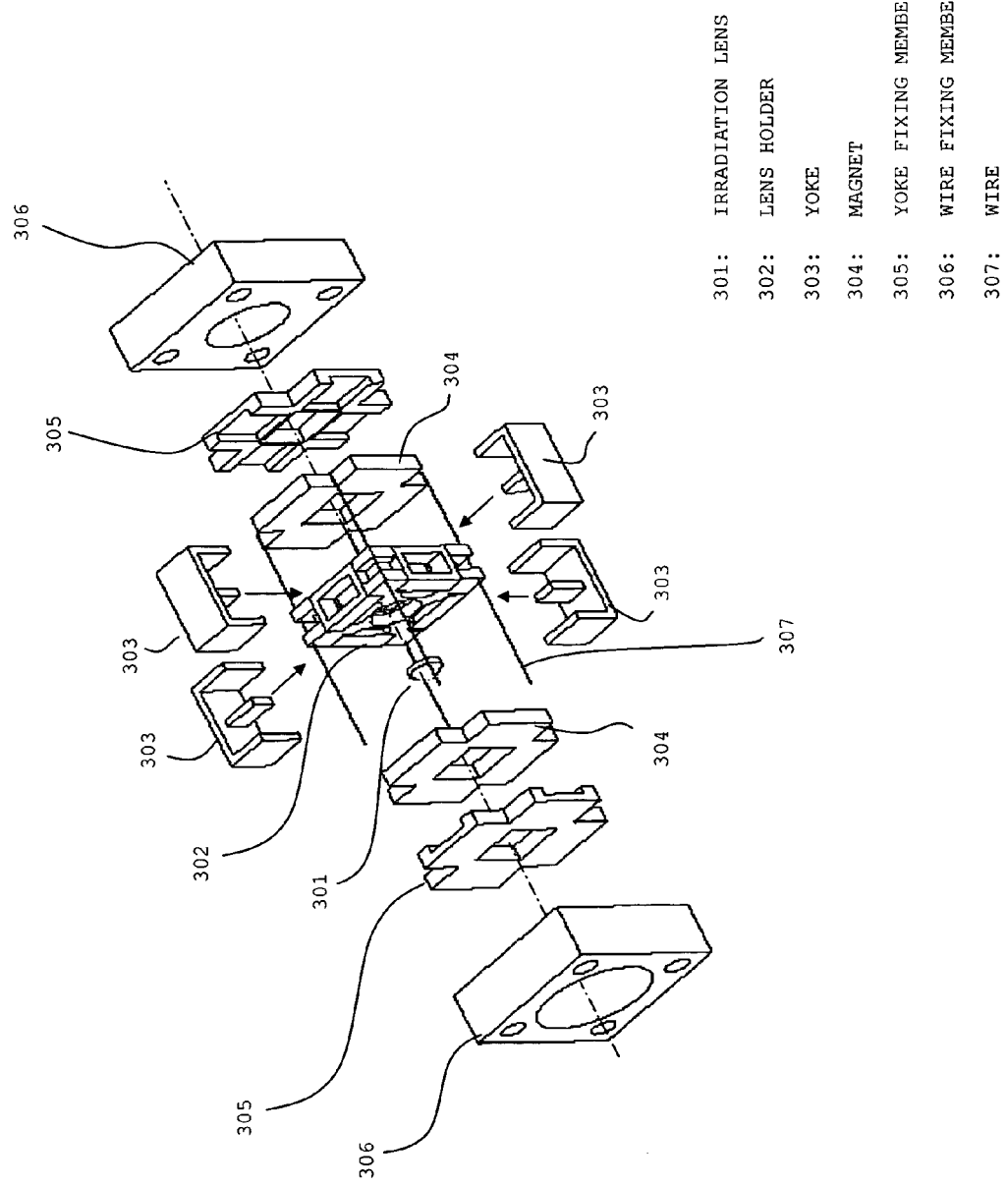
FIG. 2 shows a construction of a beam irradiation head according to the embodiment of the present invention.

FIG. 2 shows the construction of the lens actuator 300 (an exploded perspective view).

Referring to FIG. 2, an irradiation lens 301 is fitted in a central opening of a lens holder 302. Coils are fitted on four lateral faces of the lens holder 302, respectively. Central protruding portions of yokes 303 are inserted into the coils respectively as indicated by arrows shown in FIG. 2. Tongue strips of each of the yokes 303 on both sides are fittingly inserted into corresponding depressed portions of a pair of yoke fixing members 305. In addition, magnets 304 are secured to the yoke fixing members 305 respectively such that the tongue strips of the yokes 303 are sandwiched therebetween. In this state, the yoke fixing members 305 accompanied with the magnets 304 are mounted on a base (not shown).

Moreover, a pair of wire fixing members 306 are mounted on the base. The lens holder 302 is resiliently supported by the wire fixing member 306 via wires 307. Holes for fittingly inserting the wires 307 therethrough are formed through the lens holder 302 at its four corners. After the wires 307 have been fittingly inserted through the holes, respectively, both ends of each of the wires 307 are secured to the wire fixing members 306, respectively. Thus, the lens holder 302 is resiliently supported by the wire fixing members 306 via the wires 307.

At the time of driving, drive signals are supplied from the actuator driving circuit 40 to the respective coils fitted to the lens holder 302. Thus, an electromagnetic driving force is generated, so the irradiation lens 301 is two-dimensionally driven together with the lens holder 302.

Figure 3:
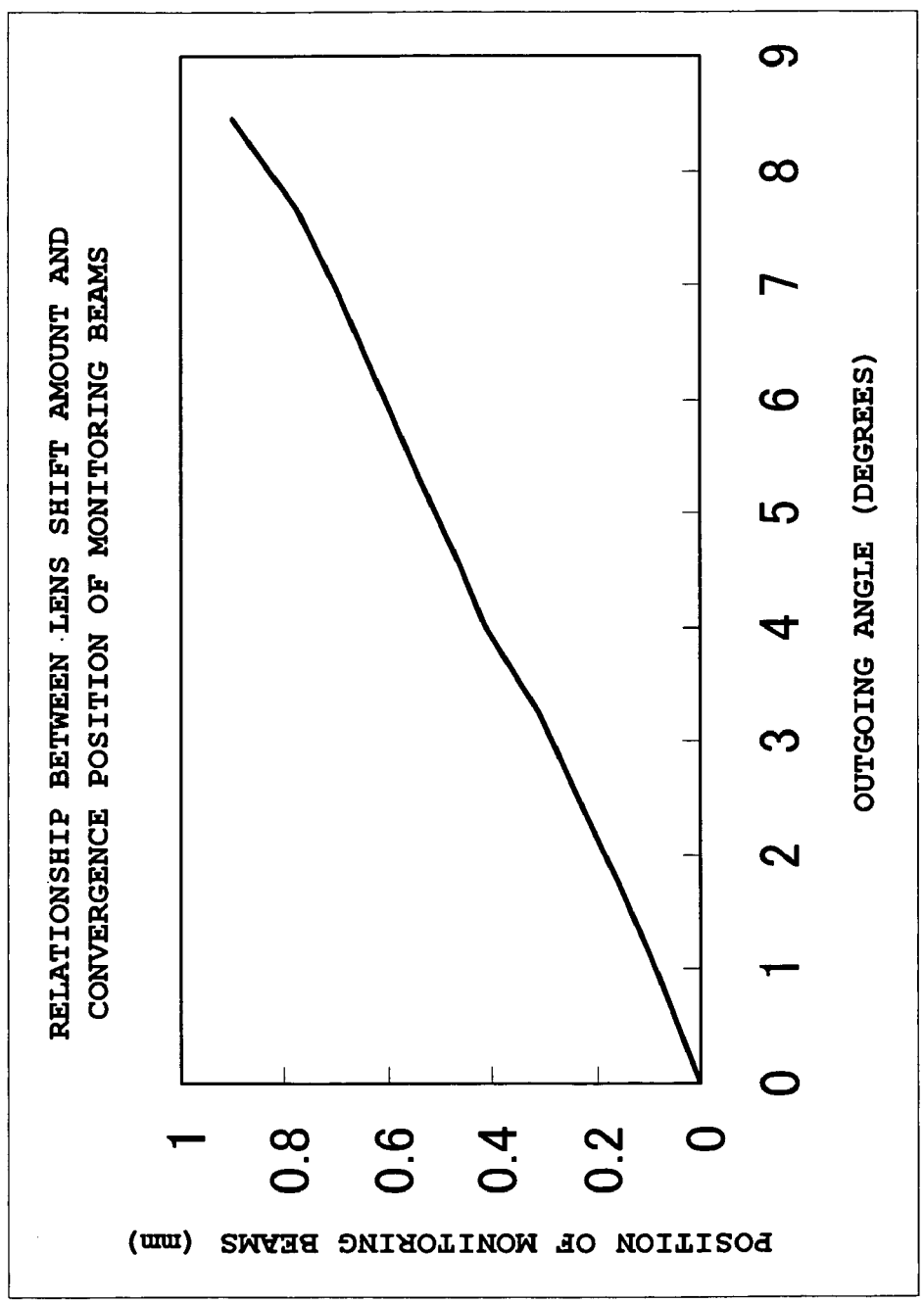
FIG. 3 shows a relationship between an outgoing angle of irradiated laser beams and a convergence position of separated beams.

FIG. 3 shows a relationship (simulation) between an outgoing angle of radiated laser beams and a convergence position of separated beams (referred to as monitoring beams of FIG. 3) on the beam receiving face of the PSD 600 at the time when the lens actuator 300 is driven to displace the irradiation lens 301 in one direction. As shown in FIG. 3, the displacement amount of the separated beams increases in proportion to the outgoing angle of the radiated laser beams. The characteristic shown in FIG. 3 is undulated because aberration is caused in the separated beams on the beam receiving face of the PSD 600 by two-dimensionally driving the irradiation lens 301.

Figure 4:
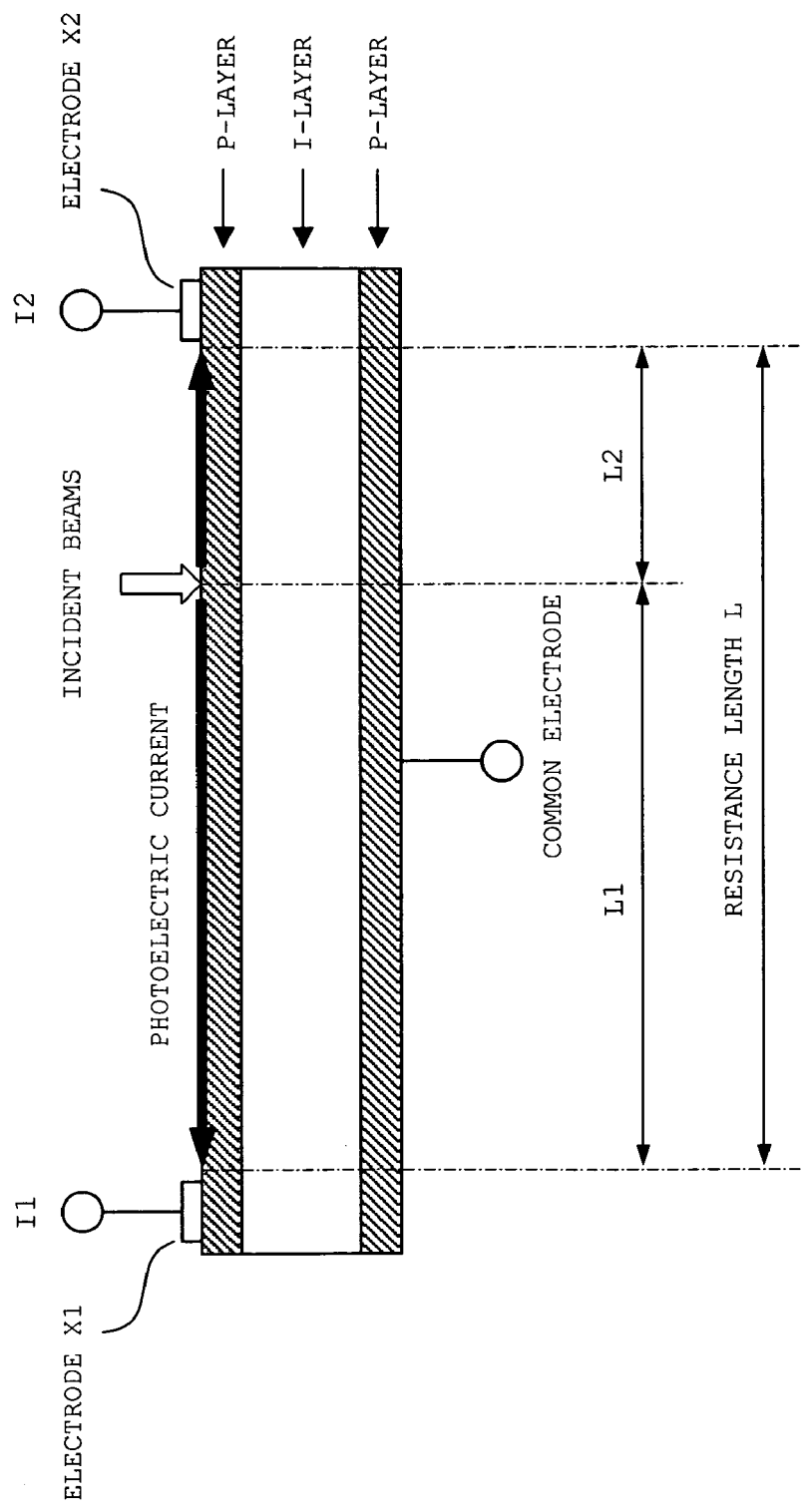
FIG. 4 shows a structure of a PSD 600 according to the embodiment of the present invention.

FIG. 4 shows the structure of the PSD 600. Referring to FIG. 4, the structure of the PSD 600 is illustrated when viewed in a y-axis direction of FIG. 1.

As shown in FIG. 4, the PSD 600 is structured such that a P-type resistance layer serving as both a beam receiving face and a resistance layer is formed on the surface of an N-type high-resistance silicon substrate. Electrodes X1 and X2 for outputting a photoelectric current in an x-axis direction of FIG. 1 and electrodes Y1 and Y2 (not shown in FIG. 4) for outputting a photoelectric current in the y-axis direction of FIG. 1 are formed on the surface of the resistance layer. A common electrode is formed on a reverse face side of the resistance layer.

When separated beams are converged on the beam receiving face, an electric charge proportional to the amount of beams is generated on a convergence position. This electric charge reaches the resistance layer as a photoelectric current, which is divided into currents inversely proportional to the distances to the respective electrodes X1, X2, Y1, and Y2. Those currents are then outputted therefrom, respectively. The currents outputted from the electrodes X1, X2, Y1, and Y2 have magnitudes that are determined inversely proportional to the distances from the convergence position of the separated beams to the respective electrodes X1, X2, Y1, and Y2. Thus, the convergence position on the beam receiving face can be detected based on values of the currents outputted from the electrodes X1, X2, Y1, and Y2.

Figure 5B:
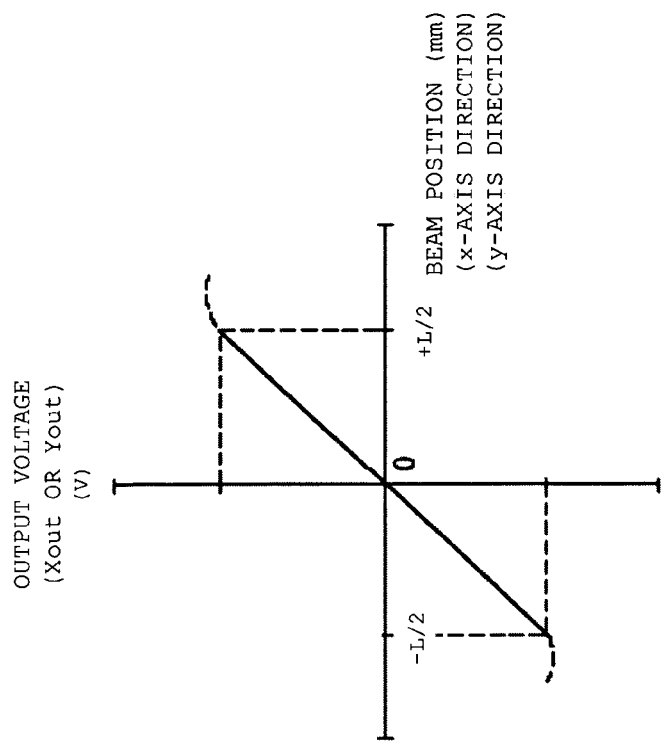
FIGS. 5A and 5B are explanatory views showing the structure of the PSD 600 and a variation in position detecting voltage, respectively.
Figure 5A:
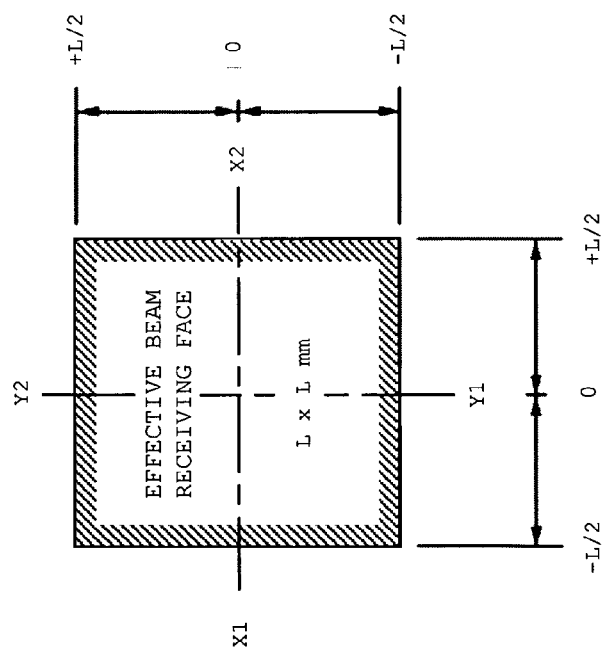

FIG. 5A is a view showing an effective beam receiving face of the PSD 600. FIG. 5B is a view showing a relationship between position detecting voltages generated in the PSD signal processing circuit 60 based on the currents outputted from the electrodes X1, X2, Y1, and Y2 and the convergence position of the separated beams on the effective beam receiving face. Referring to FIG. 5A, the effective beam receiving face is square. Given that a center position of the effective beam receiving face is a reference position (0 position), FIG. 5B shows a relationship between displacement amounts of the convergence position in the x-axis direction and the y-axis direction with respect to the reference position and an output voltage.

Based on the currents outputted from the electrodes X1, X2, Y1, and Y2, the PSD signal processing circuit 60 generates a voltage Xout corresponding to a displacement amount of the convergence position in the x-axis direction and a voltage Yout corresponding to a displacement amount of the convergence position in the y-axis direction, and outputs the voltage Xout and voltage Yout to the DSP control circuit 10 via the ADC 70. The DSP control circuit 10 detects the displacement amounts of the convergence position in the x-axis direction and the y-axis direction from the inputted voltages Xout and Yout, respectively.

A scan operation in this embodiment will be described with reference to FIGS. 6A, 6B, and 6C.

Figure 6A:
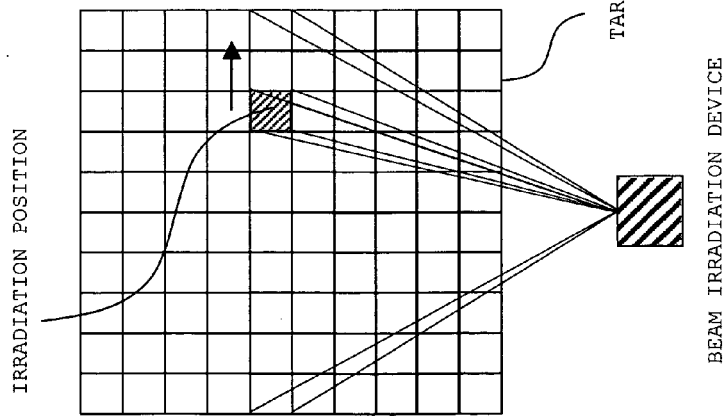
FIGS. 6A, 6B, and 6C are explanatory views showing scan operation according to the embodiment of the present invention.

As shown in FIG. 6A, radiated laser beams are scanned so as to sequentially irradiate matrices into which the target region set in the space in front of the beam irradiation device is divided. The sequence in which the matrices are scanned can be set arbitrarily. For example, as shown in FIG. 6B, a setting can also be made such that the matrices are sequentially scanned line by line starting from the one at the upper-left corner position. As described above, a scan trajectory (scan sequence) is prescribed in the scan table of the DSP control circuit 10.

Figure 6B:
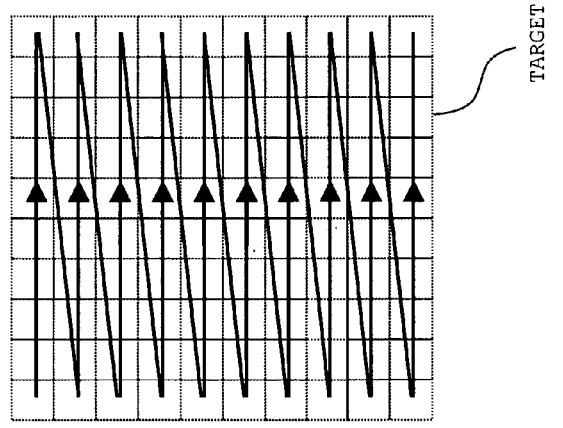
Figure 6C:
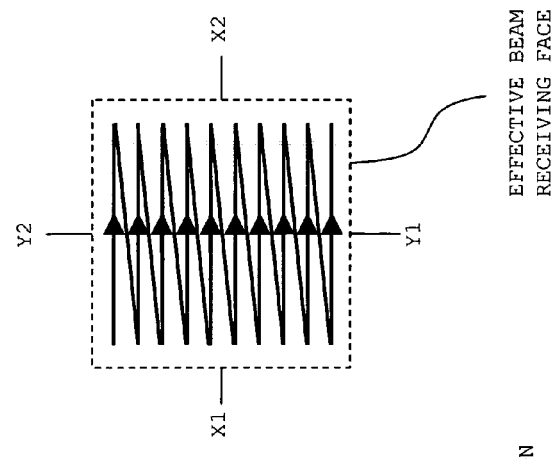

The convergence position of separated beams on the beam receiving face of the PSD 600 moves along a trajectory shown in FIG. 6C when a scan is performed as shown in FIG. 6B. The trajectory of FIG. 6C corresponds to the scan trajectory of FIG. 6B on one-to-one basis. Accordingly, the scan position of radiated laser beams can be identified from the convergence position on the trajectory of FIG. 6C. In this case, as described above, the trajectory of FIG. 6C complies with the trajectory table in the DSP control circuit 10.

In the beam irradiation device, it is most ideal that radiated laser beams are scanned along the scan trajectory shown in FIG. 6B. However, since the beam irradiation device usually undergoes undesired vibrations, disturbances, and the like, the scan position of the radiated laser beams deviates from a desired scan trajectory. In this case, the convergence position of the separated beams on the beam receiving face also deviates from the trajectory shown in FIG. 6C in accordance with the deviation of the scan position.

Figure 7:
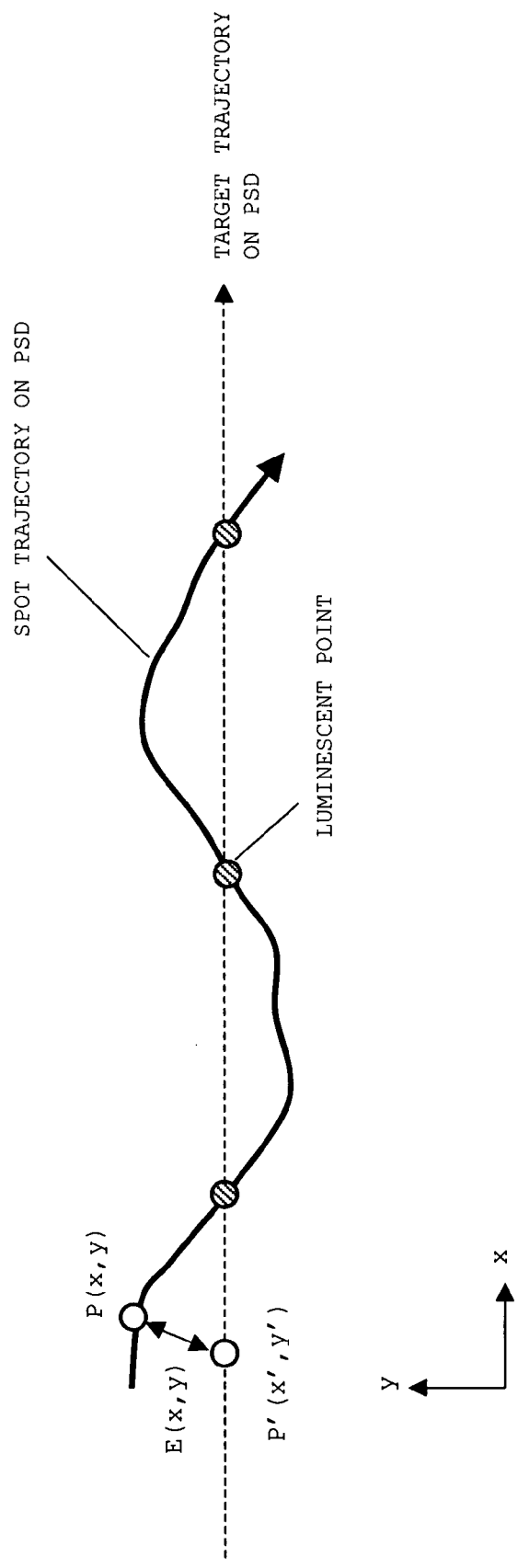
FIG. 7 is an explanatory view showing an application of a trajectory servo according to the embodiment of the present invention.

FIG. 7 shows an example of a spot trajectory of separated beams on the effective beam receiving face. In this case, as described above, the scan control routine 10a supplies a servo signal to the actuator driving circuit 40 so that the convergence position of the separated beams is drawn to the target trajectory.

It is now assumed that the convergence position of separated beams is P(x, y) and that the convergence position to be located on the target trajectory is P' (x', y') at this moment. The convergence position P' (x', y') on the target trajectory is acquired from the trajectory table set in the DSP control circuit 10. More specifically, the convergence position corresponding to the scan position of radiated laser beams is acquired from the trajectory table.

In this case, the scan control routine 10a calculates Ex=x−x' and Ey=y−y' based on P (x, y) and P' (x', y') and supplies a servo signal to the actuator driving circuit 40 based on a calculation result such that both Ex and Ey become equal to 0. Thus, the scan position of radiated laser beams is drawn back toward a scan position to be located on the scan trajectory at this moment. In response to this, the convergence position of separated beams is also drawn toward the convergence position P' (x', y') to be located on the target trajectory at this timing. Due to this servo operation, the radiated laser beams are scanned so as to follow the desired scan trajectory.

While the scan operation is performed with application of servo, the scan control routine 10a monitors, as described above, whether or not the convergence position of separated beams has reached the position preset as the position (luminescent point) for detecting an obstacle, a distance, or the like. The outgoing power of the semiconductor laser 100 is then set to the high level Pwb in a pulse-like manner for a certain period at a timing when the convergence position has reached the luminescent point.

It is determined whether or not the convergence position has reached the luminescent point, depending on whether or not the distance between the convergence position and the luminescent point has become smaller than a preset distance. Thus, beams can be emitted with high power in the neighborhood of a desired convergence position even when the convergence position has somewhat deviated from the target trajectory.

Figure 8:
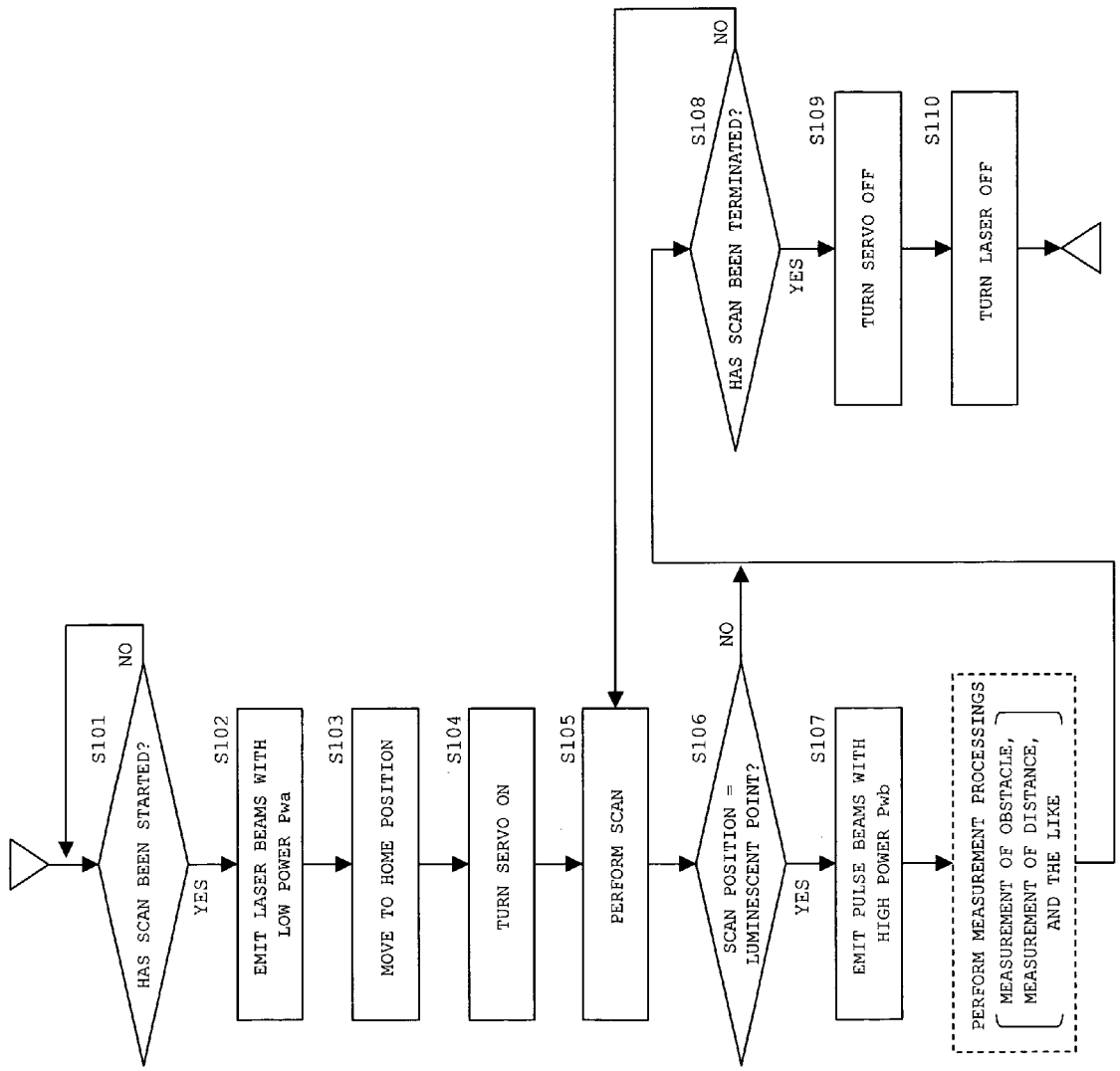
FIG. 8 is a flowchart for the scan operation according to the embodiment of the present invention.

FIG. 8 shows a flowchart used in performing the scan operation.

When the scan operation is started in S101, laser beams are emitted from the semiconductor laser 100 with low power (Pwa) in S102. After that, the irradiation position of radiated laser beams is shifted to a home position in S103. The home position is set to, for example, a position of a leftmost, vertically substantially central one of the matrices shown in FIG. 6B. Furthermore, after a trajectory servo for the radiated laser beams has been turned ON in S104, the scan is performed in S105.

Then, it is determined in S106 whether or not the scan position has reached the luminescent point. When the scan position has not reached the luminescent point, it is determined in S108 whether or not the scan operation has been terminated. After that, a processing returns to S105 to continue to perform the scan operation with the trajectory servo ON. On the other hand, when the scan position has reached the luminescent point, the outgoing laser power of the semiconductor laser 100 is set to the high power Pwb in a pulse-like manner for a certain period in S107, so the target region is irradiated with high-power radiated laser beams. At this moment, a detector mounted with the beam irradiation device performs processings of measuring an obstacle, measuring a distance, etc. by receiving beams reflected from the target region.

After that, it is determined in S108 whether or not the scan operation has been terminated. When the scan operation has not been terminated, a processing returns to S105 to repeat the aforementioned scan operation (with the low power Pwa). On the other hand, when the scan operation has been terminated, the trajectory servo is turned OFF in S109 and then the semiconductor laser 100 is turned OFF in S110.

As described above, this embodiment makes it possible to smoothly draw the scan position of radiated laser beams back to the desired scan trajectory even when the scan position has deviated therefrom. Accordingly, a stable scan operation can be realized even when the beam irradiation device undergoes undesired vibrations or disturbances.

Figure 9:
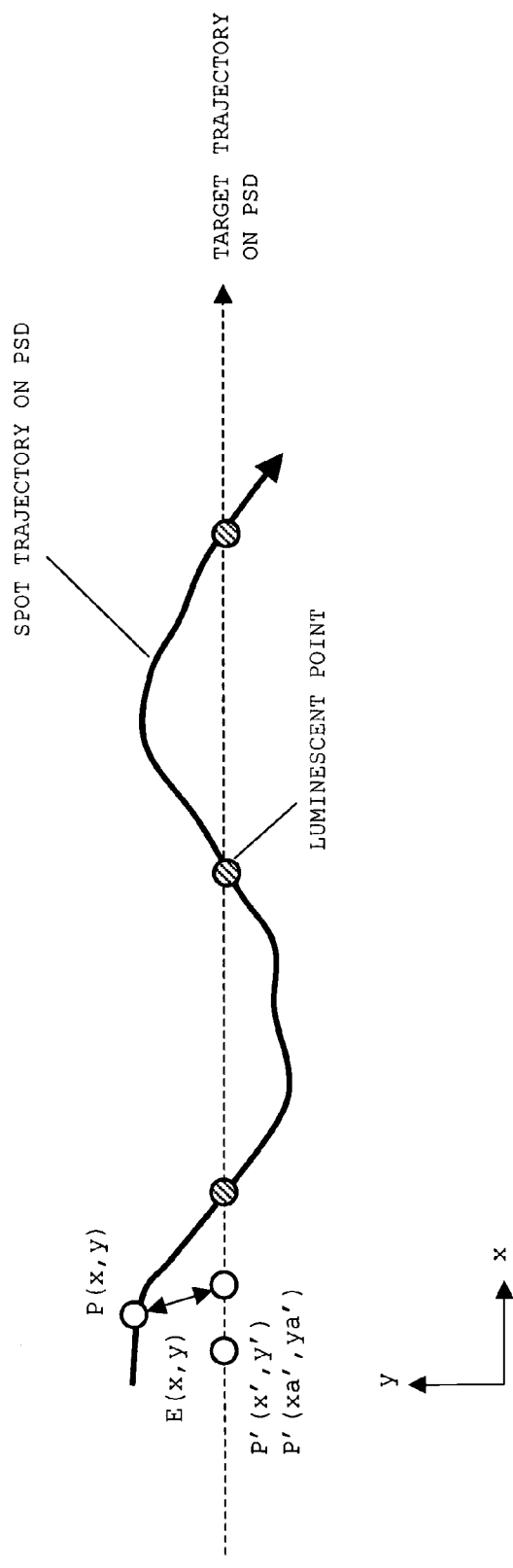
FIG. 9 is an explanatory view showing a modified example of the application of the trajectory servo in the embodiment of the present invention.

Although servo is applied such that the convergence position P(x, y) of separated beams is drawn toward the convergence position P' (x', y') to be located on the target trajectory at the above-mentioned timing in the aforementioned embodiment as described with reference to FIG. 7, the convergence position of separated beams can also be drawn onto the target trajectory through other servo processings. For example, as shown in FIG. 9, the convergence position of separated beams can also be drawn toward a convergence position P' (xa', ya') to be located on the target trajectory after the lapse of ΔT from the above-mentioned timing. In this case, the DSP control circuit 10 calculates Ex=x−xa' and Ey=y−ya' based on P(x, y) and P' (xa', ya') and supplies a servo signal to the actuator driving circuit 40 based on a result of the calculation such that both Ex and Ey become equal to 0. In this manner, the scan position of radiated laser beams can be smoothly drawn toward a subsequently scheduled scan position. As a result, an efficient scan operation can be realized.

Next, setting of a scan pattern and a target region will be described.

FIGS. 10A to 10F show scan pattern variations that can be set by the scan control routine 10a. The scan patterns are preferably used at the time of right or left turn, high-speed driving, or detection of the obstacle. As described above, the scan patterns are held in the DSP control circuit 10 as the table (scan table) for scanning the irradiation position of laser beams within the target region and the table (trajectory table) indicating a trajectory of the convergence position of separated beams on the beam receiving face when the laser beams are scanned according to the scan table.

FIG. 10A shows a scan pattern in the case where scan weighting of a center portion of the target region is improved. The scan pattern is preferably used at the time of high-speed driving. This is because it is necessary to instantaneously detect an obstacle located at a distance on a driving path of the vehicle at the time of high-speed driving. When the scan weighting of the center portion of the target region is improved as shown in FIG. 10A, a scan frequency on a position corresponding to a distant position straight-ahead the vehicle increases. Therefore, the obstacle located at the distant position straight-ahead the vehicle can be smoothly detected.

FIG. 10B shows a scan pattern in the case where scan weighting of a center portion in a lateral width direction is improved. The scan pattern is preferably used at the time of high-speed driving as in the case shown in FIG. 10A. When the scan pattern is used, the scan frequency on the position corresponding to the distant position straight-ahead the vehicle also increases. Therefore, the obstacle located at the distant position straight-ahead the vehicle can be smoothly detected.

FIG. 10C shows a scan pattern in the case where scan weighting of a center portion in a longitudinal width direction is improved. The scan pattern is preferably used at the time of high-speed driving as in the case of each of the above-mentioned patterns. When the scan pattern is used, the scan frequency on the position corresponding to the distant position straight-ahead the vehicle also increases, so that the obstacle located at the distant position straight-ahead the vehicle can be smoothly detected. When the case of the scan pattern is compared with the case shown in FIG. 10B, a region in which the scan frequency is large is extended in a lateral direction. Therefore, a region capable of improving the detection precision of the obstacle can be extended in a lateral direction. Thus, it is possible to detect an obstacle which may suddenly run into a traveling path.

FIG. 10D shows a scan pattern in the case where scan weighting of a right side portion in the lateral width direction is improved. The scan pattern is preferably used at the time of right turn driving. This is because it is necessary to instantaneously detect whether or not an obstacle exists in a right side region to which a vehicle will turn at the time of right turn driving. When the scan weighting of the right side region is improved as shown in FIG. 10D, the scan frequency on the right side region increases, so that the obstacle located at a right side position in a traveling direction can be smoothly detected. When scan weighting of a left side portion in the lateral width direction is to be improved, a scan pattern is obtained by laterally symmetrically folding back the scan pattern shown in FIG. 10D. In this case, the scan frequency on a left side region increases, so that an obstacle located at a left side position in the traveling direction can be smoothly detected.

FIG. 10E shows a scan pattern in the case where scan weighting of a right side portion in the lateral width direction is improved. The scan pattern is preferably used at the time of right turn driving as in the case shown in FIG. 10D. When the scan pattern is used, the scan frequency on the right side region increases, so that the obstacle located at a right side position can be smoothly detected. When scan weighting of a left side portion in the lateral width direction is to be improved, a scan pattern is obtained by laterally symmetrically folding back the scan pattern shown in FIG. 10E. In this case, the scan frequency on a left side region increases, so that an obstacle located at a left side position in the traveling direction can be smoothly detected.

FIG. 10F shows a scan pattern in the case where scan weighting of a point (target position) within the target region is improved. The scan pattern is preferably used at the time of detection of the obstacle. This is because, when an obstacle detection position is set as the target position, the scan frequency in the vicinity of the obstacle position increases, so that, for example, a variation in position of the obstacle can be smoothly detected. The scan pattern shown in FIG. 10F can be obtained by executing calculation processing for changing a scan origin (center portion of the target region in FIG. 10A) of the scan pattern shown in FIG. 10A to the target position. In this case, the scan pattern shown in FIG. 10A is held in the DSP control circuit 10. The scan control routine 10a executes calculation processing for changing the scan origin on the held scan pattern.

FIGS. 11A to 11D and FIGS. 12A to 12D show modified examples of the target region and the scan pattern at the time of right turn driving.

Referring to FIGS. 11A to 11D, a scan pattern shown in FIG. 11A is set at the time of straight-path driving. When a driver turns the steering wheel to the right side in this state and then a signal related to right turn steering is inputted to the scan control routine 10a, the target region is shifted or the scan pattern is changed as shown in FIGS. 11B, 11C, and 11D.

FIG. 11B shows an example in which the target region is shifted to the right side relative to a center axis of a forward region in the traveling direction. In this case, an area (area shifted to the right side) asymmetrical about the center axis of the forward region in the traveling direction is scanned. Therefore, it is possible to instantaneously detect whether or not an obstacle exists in a right side region to which the vehicle will turn. At this time, the scan pattern shown in FIG. 11A is held in the DSP control circuit 10. The scan control routine 10a executes processing for changing the target region on the held scan pattern based on the steering direction and the steering angle. In this case, an angle between a direction toward the center axis of the target region from the vehicle and a direction toward the center axis of the forward region in the traveling direction from the vehicle is set so as to simply increase according to the steering angle, for example.

FIG. 11C shows an example in which the target region is not shifted and the scan pattern is changed to a pattern for improving weighting of the right side region. In this case, it is also possible to instantaneously detect whether or not the obstacle exists in a right-turn direction. An area symmetrical about the center axis of the forward region in the traveling direction is scanned, so the obstacle located in the forward region in the traveling direction can be also detected unlike the case shown in FIG. 11A. In this case, the scan pattern shown in FIG. 11A and the scan pattern shown in FIG. 11C are held in the DSP control circuit 10. The scan control routine 10a executes processing for selecting a scan pattern corresponding to the steering direction from the held scan patterns and setting the selected scan pattern.

FIG. 11D shows an example in which the target region is shifted to the right side and the scan pattern is changed to a pattern for improving the weighting of the right side region. In this case, it is possible to more instantaneously detect whether or not the obstacle exists in the right-turn direction as compared with the cases shown in FIGS. 11B and 11C. At this time, the scan pattern shown in FIG. 11A and the scan pattern shown in FIG. 11C are held in the DSP control circuit 10. The scan control routine 10a executes processing for selecting a scan pattern corresponding to the steering direction from the held scan patterns and setting the selected scan pattern. In addition, the scan control routine 10a executes processing for changing the target region based on the steering direction and the steering angle.

FIGS. 12A to 12D show examples in which the scan pattern used at the time of straight-path driving is changed from the scan pattern shown in FIG. 11A to a scan pattern shown in FIG. 12A in the examples shown in FIGS. 11A to 11D. In this case, when the signal related to right turn steering is inputted to the scan control routine 10a, the target region is shifted or the scan pattern is changed as shown in FIGS. 12B, 12C, and 12D. In those examples, it is possible to instantaneously detect whether or not the obstacle exists in the right side portion as in the cases shown in FIGS. 11B, 11C, and 11D.

In the case of left turn steering, unlike the examples shown in FIGS. 11A to 11D and FIGS. 12A to 12D, the target region is shifted to the left side or the scan pattern is changed to a pattern in which weighting of the left side region is improved.

Figure 13A:
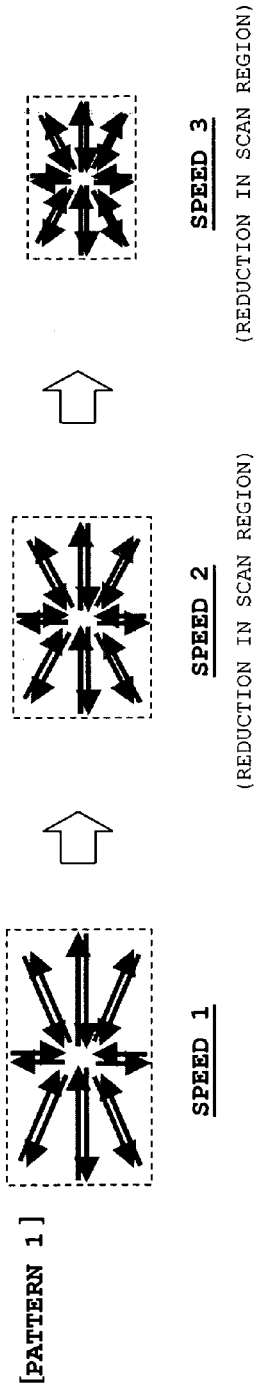
FIGS. 13A to 13C show modified examples of the scan pattern when a traveling speed changes according to the embodiment of the present invention.
Figure 13B:
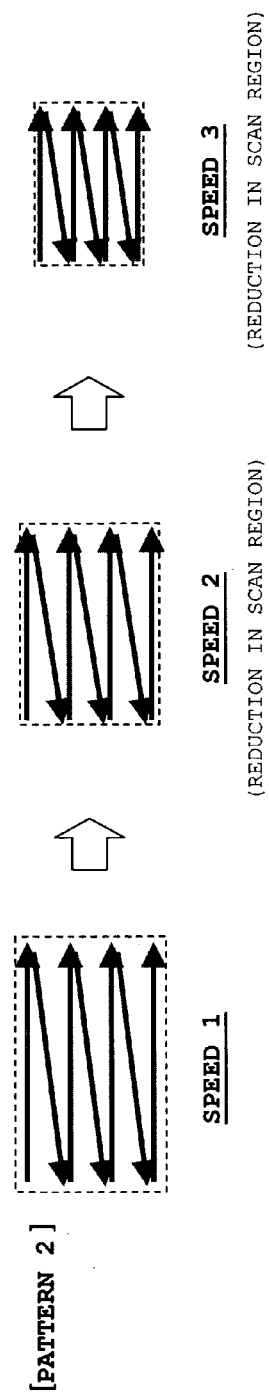
Figure 13C:
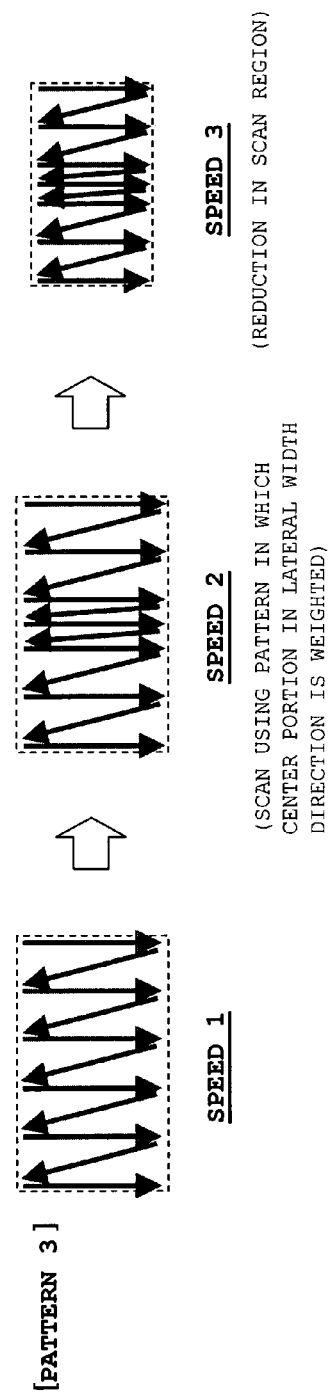

FIGS. 13A to 13C show modified examples of the target region and the scan pattern in the case where a driving speed increases. In FIGS. 13A to 13C, Speed 1 corresponds to a driving speed equal to or smaller than a first threshold speed, Speed 2 corresponds to the driving speed larger than the first threshold speed and equal to or smaller than a second threshold speed, and Speed 3 corresponds to the driving speed larger than the second threshold speed. In such cases, the scan control routine 10a monitors a signal related to the driving speed as an external signal and suitably changes the target region and the scan pattern based on the monitored driving speed.

In the examples shown in FIGS. 13A and 13B, the target region is gradually reduced with an increase in driving speed. Therefore, the scan frequency on the position corresponding to the distant position straight-ahead the vehicle increases, with the result that the obstacle located at the distant position straight-ahead the vehicle can be smoothly detected. In this case, the scan pattern applied in the case of Speed 1 is held in the DSP control circuit 10. The scan control routine 10a executes processing for changing the target region based on the driving speed.

In the example shown in FIG. 13C, with an increase in driving speed, the scan pattern is changed to a pattern in which weighting of the center portion is improved. When the driving speed further increases, the target region is reduced. In this example, the scan frequency on the position corresponding to the distant position straight-ahead the vehicle also increases, so that the obstacle located at the distant position straight-ahead the vehicle can be smoothly detected. In this case, the scan pattern applied in the case of Speed 1 and the scan pattern applied in the case of Speed 2 are held in the DSP control circuit 10. The scan control routine 10a executes processing for selecting and setting the scan pattern based on a current driving speed and processing for changing the target region based on the current driving speed.

Figure 14A:
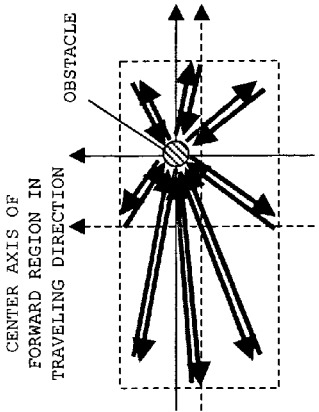
FIGS. 14A to 14C show modified examples of the scan pattern at the time of detection of an obstacle according to the embodiment of the present invention.
Figure 14B:
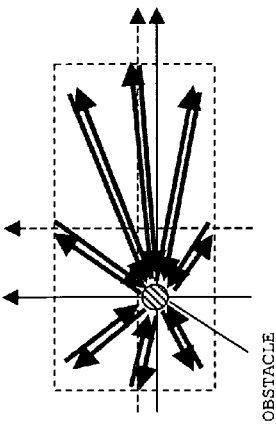
Figure 14C:
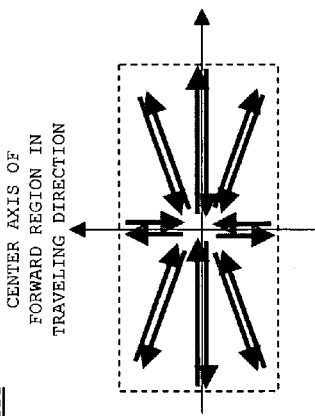

FIGS. 14A to 14C show changes of the scan patterns at the time of detection of the obstacle.

When the obstacle is detected within the target region during normal driving using a scan pattern as shown in FIG. 14A, an origin position of the scan pattern is changed to the obstacle detection position as shown in FIG. 14B or 14C. In response to this, the scan trajectory of the target region is changed as shown in FIG. 14B or 14C. When the scan trajectory of the target region is changed, the scan frequency in the vicinity of the obstacle position increases, so that, for example, a variation in position of the obstacle can be smoothly detected. In this case, the scan pattern shown in FIG. 14A is held in the DSP control circuit 10. The scan control routine 10a executes calculation processing for changing the scan origin on the held scan pattern to the obstacle detection position and resetting the scan trajectory.

Figure 15:
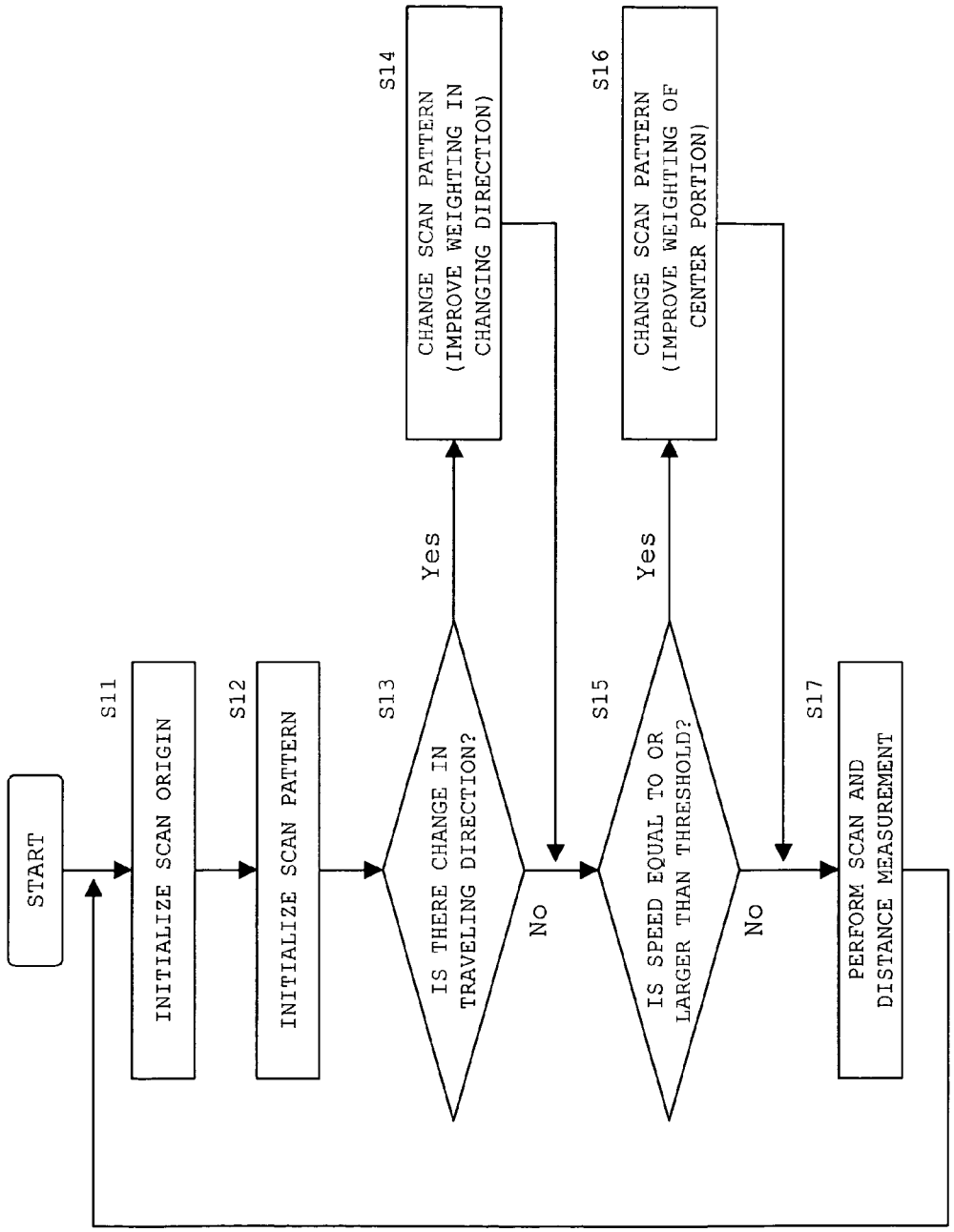
FIG. 15 is a flowchart showing a flow of scan pattern changing processing when the traveling direction and the traveling speed change according to the embodiment of the present invention.

FIG. 15 is a processing flowchart for the case where the scan pattern is changed based on variations in steering direction and driving speed.

When the scan operation starts, the origin position of the scan pattern is set as the center position of the target region (Step S11). In addition, a scan pattern to be applied for the normal driving is set as a pattern for the scan operation (Step S12). Then, whether or not there is a change in the traveling direction (right turn steering or left turn steering) is determined based on successively input external signals (Step S13). When there is a change in the traveling direction (Step S13: Yes), an initialized scan pattern is changed to a scan pattern for improving scan weighting in a direction in which there is the change (for example, shown in any one of FIGS. 11B to 11D and FIGS. 12B to 12D) (Step S14). When there is no change in the traveling direction (Step S13: No), the initialized scan pattern is not changed.

After the scan pattern is set as described above, whether or not a current driving speed exceeds a predetermined threshold is determined based on an external signal related to the inputted current driving speed (Step S15). When the current driving speed exceeds the predetermined threshold (Step S15: Yes), the target region is made smaller than a normal target region based on the driving speed to improve the scan weighting of the center portion in the driving direction (Step S16). When the current driving speed does not exceed the predetermined threshold (Step S15: No), the normal target region is set as the target region for the scan operation.

After that, when the scan pattern and the target region are set, the scan pattern is fit to the target region to set the scan trajectory for the scan operation. Scan with laser beams is performed along the scan trajectory. Obstacle detection processing and distance measurement processing to the obstacle are performed at each scan position based on a state of reflection beams during the scan (Step S17).

When the first scan operation is completed, processing returns to Step S11 and the same processing is repeated. Obstacle detection processing and distance measurement processing to the obstacle are performed for each scan and results obtained by processing are outputted to, for example, a control circuit for controlling the driving state of the vehicle.

In Step S16, another scan pattern may be set instead of reduction in target region. For example, when it is determined that there is no change in the traveling direction in Step S13, the scan pattern initialized in Step S12 may be changed to the scan pattern suitable for high-speed driving in Step S16. In particular, when the initialized scan pattern is the scan pattern shown in FIG. 12A, this may be changed to the scan pattern shown in FIG. 10A or 10B in Step S16. Alternatively, the scan pattern which is set in Step S13 and suitable for left or right turn, for example, the scan pattern shown in FIG. 11C or 12C may be changed to the scan pattern suitable for both the high-speed driving and the left or right turn, for example, a scan pattern in which scan frequencies on the center portion in the traveling direction and a side portion in the steering direction within the target region increase.

In Step S14, for example, as shown in FIGS. 11B and 11D and FIGS. 12B and 12D, the target region may be shifted in the steering direction, instead of changing of the scan pattern or in addition to changing of the scan pattern.

Note that FIG. 15 is the processing flowchart for the case where the scan pattern is changed based on variations in steering direction and driving speed. Here, when the scan pattern is changed based only on a variation in steering direction, Steps S15 and S16 in FIG. 15 are omitted. When the scan pattern is changed based only on a variation in driving speed, Steps S13 and S14 in FIG. 15 are omitted.

According to the flowchart shown in FIG. 15, it is possible to instantaneously detect whether or not the obstacle exists in the steering direction at the time of left or light turn. In addition, it is possible to instantaneously detect whether or not the obstacle exists at the distant position in the driving direction during the high-speed driving.

Figure 16:
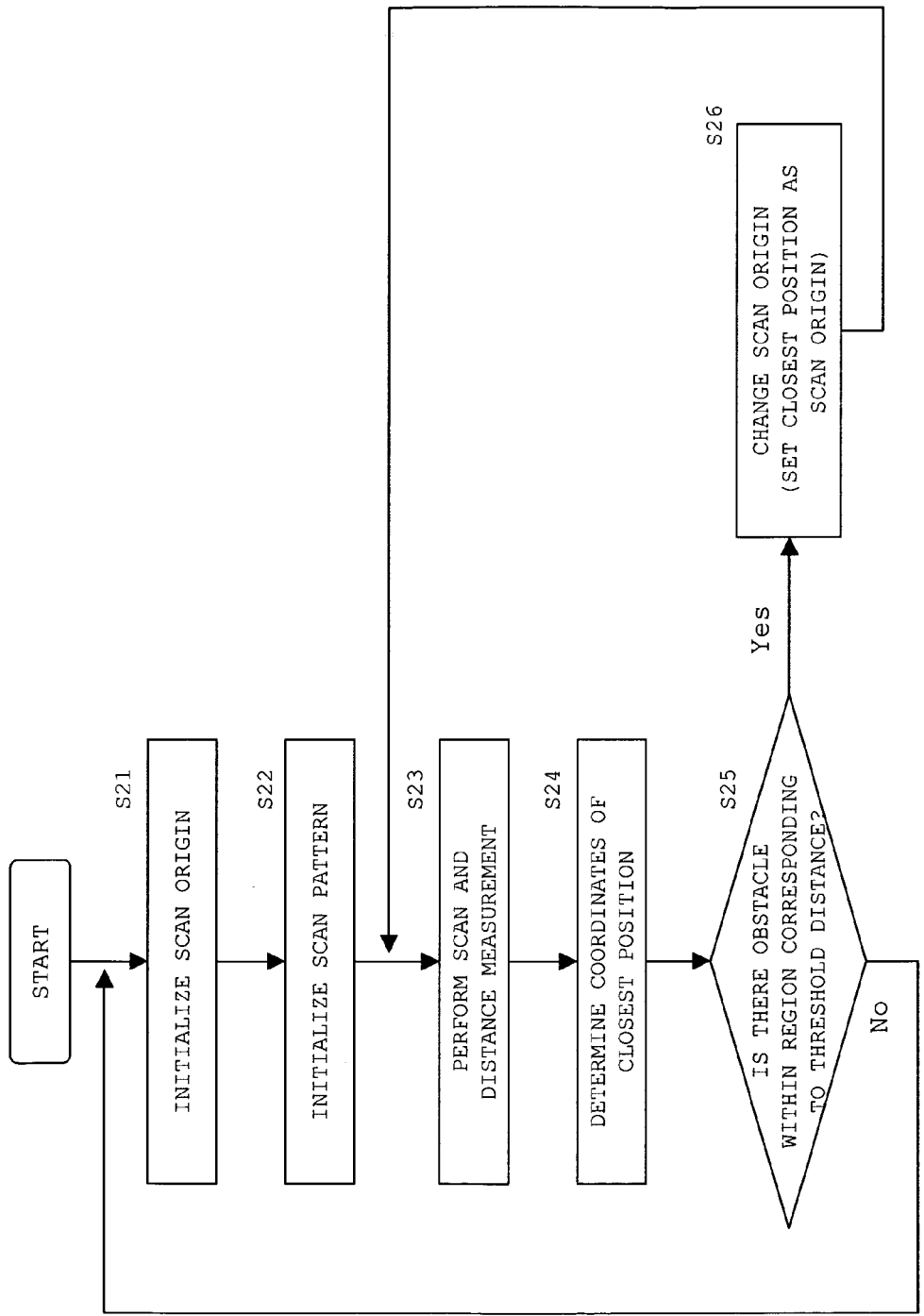
FIG. 16 is a flowchart showing a flow of scan pattern changing processing at the time of detection of the obstacle according to the embodiment of the present invention.

FIG. 16 is a processing flowchart for the case where the scan pattern is changed in response to the detection of the obstacle.

When the scan operation starts, the origin position of the scan pattern is set as the center position of the target region (Step S21). In addition, the scan pattern to be applied for the normal driving is set as the pattern for the scan operation (Step S22). Then, the scan pattern is fit to the target region to set the scan trajectory for the scan operation. Scan with laser beams is performed along the scan trajectory. Obstacle detection processing and distance measurement processing to the obstacle are performed at each scan position based on a state of reflection beams during the scan (Step S23).

When the obstacle is detected within the target region in the processings, a scan position (coordinate position within the target region) where the vehicle is closest to the obstacle is determined based on distances between the obstacle and the vehicle in respective scan positions (Step S24). Then, whether or not a distance between the obstacle and the vehicle in the closest scan position is shorter than a threshold distance is determined (Step S25). When the distance is shorter than the threshold distance (Step S25: Yes), the closest scan position is set as the origin position of the target region and a scan trajectory according to the origin position corresponding to the closest scan position is calculated (Step S26). At a next scan timing, the scan with laser beams is formed along the calculated scan trajectory. Obstacle detection processing and distance measurement processing to the obstacle are performed at each scan position (Step S23).

The resetting of the scan trajectory and the scan operation based thereon are repeated until the obstacle is not detected within the target region or the distance between the obstacle and the vehicle in the closest scan position is larger than the threshold distance (Step S25: Yes→Step S26). When the determination in Step S25 becomes No, processing returns to Step S21. Then, the scan origin position and the scan pattern are initialized (Steps S21 and S22) and obstacle detection and distance measurement are performed based thereon (Step S23).

According to the flowchart shown in FIG. 16, the scan frequency in the vicinity of the obstacle position increases based on the detection of the obstacle, so that, for example, a variation in position of the obstacle can be smoothly detected.

Although the embodiment of the present invention is described above, the present invention is not limited to the above-mentioned embodiment.

For example, in the above-mentioned embodiment, the present invention is applied to the beam irradiation device for vehicle. The present invention can be applied to a beam irradiation device for moving object such as ship or airplane.

The embodiment of the present invention can be variously modified as appropriate without departing from the scope of technical idea described in the claims.

What is claimed is:

1. A detection device for detecting an obstacle within a target region by emitting a laser beam to the target region, comprising:
   scan control means for controlling a scan trajectory of the laser beam to scan the target region based on a signal related to a moving state of a moving object on which the detection device is mounted,
   wherein the scan control means shifts the target region in a direction to which the traveling direction is changed from a center axis in the traveling direction, based on the signal related to the traveling direction of the moving object, and
   the scan control means controls a scan frequency for a portion of the target region to be different from that of another portion to perform finer scanning on the portion than the another portion.

2. A detection device according to claim 1, wherein the scan control means sets, as the scan trajectory of the laser beam, a scan trajectory for increasing scan frequency on a portion shifted in a direction to which the traveling direction is changed from a center axis in the traveling direction, based on the signal related to the traveling direction of the moving object.

3. A detection device according to claim 2, wherein the scan control means sets, as a scan pattern of the laser beam within the target region, a scan pattern for increasing scan frequency on a portion shifted in the direction to which the traveling direction is changed from a center portion of the target region, based on the signal related to the traveling direction of the moving object.

4. A detection device according to claim 2, wherein the scan control means sets, as the scan trajectory of the laser beam, a scan trajectory for increasing scan frequency on a center portion of a forward region in the traveling direction with an increase of the traveling speed, based on the signal related to the traveling speed of the moving object.

5. A detection device according to claim 4, wherein the scan control means reduces the target region toward the center portion in the traveling direction with an increase of the traveling speed, based on the signal related to the traveling speed of the moving object.

6. A detection device according to claim 4 or 5, wherein the scan control means sets, as a scan pattern of the laser beam within the target region, a scan pattern for increasing scan frequency on the center portion of the target region with the increase of the traveling speed, based on the signal related to the traveling speed of the moving object.

* * * * *